United States Patent Office 2,757,218
Patented July 31, 1956

2,757,218

RUBBER DERIVATIVES FROM FUMARIC ESTERS

Joachim Dazzi, Dayton, Ohio, assignor to Monsanto Chemical Company, St. Louis, Mo., a corporation of Delaware No Drawing. Application April 27, 1953,
Serial No. 351,512

7 Claims. (Cl. 260—768)

This invention relates to high molecular weight adducts and more particularly provides high molecular weight compounds having a plurality of carboxylate radicals and a process for producing the same.

An object of the invention is the provision of new and useful polycarboxylates. Another object of the invention is the preparation of high molecular weight, viscous polycarboxylates from natural rubbers. A further object of the invention is to provide for the synthetic resins and plastics, rubber, coatings and textile industries a new class of viscous, high molecular weight polycarboxylates.

These and other objects of the invention hereinafter disclosed are provided by the following invention wherein there are prepared high molecular weight, viscous adducts of natural rubber and an ester having the formula

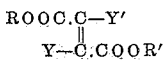

in which R and R' are selected from the class consisting of alkyl radicals of from 1 to 8 carbon atoms, alkoxyalkyl radicals of from 2 to 8 carbon atoms, alkylmercaptoalkyl radicals of from 4 to 8 carbon atoms, alicyclic radicals of from 3 to 6 carbon atoms, aryl radicals of from 6 to 12 carbon atoms and aralkyl radicals of from 7 to 11 carbon atoms and the furfuryl and tetrahydrofurfuryl radicals, and Y and Y' are selected from the class consisting of hydrogen, halogen and the methyl radical, from 1 to 3 moles of said fumarate being combined at each of at least 5 per cent of the olefinic units of the rubber molecule.

Fumarates having the above formula and useful for the present purpose include the fumarates, chlorofumarates, dichlorofumarates, mesaconates and dimethylfumarates, e. g. the simple alkyl fumarates such as methyl, ethyl, isopropyl, n-propyl, n-butyl, tert-butyl, isoamyl, n-hexyl, n-heptyl or isooctyl fumarate; the mixed alkyl fumarates such as ethyl methyl fumarate, methyl n-octyl fumarate and butyl 2-ethylhexyl fumarate; the simple alkoxyalkyl fumarates such as bis(2-methoxyethyl), bis(3-ethoxy-n-propyl), or bis(4-butoxybutyl) fumarate; the mixed alkoxyalkyl fumarates such as 3-propoxypropyl 2-ethoxyethyl fumarate or methoxymethyl 2-amyloxyethyl fumarate and fumarates derived from both a fatty alcohol and a glycol mono-ether such as ethyl 2-ethoxyethyl fumarate or n-amyl 3-propoxy-2-propyl fumarate, the hydroxyalkyl fumarates such as bis(2-hydroxyethyl) fumarate or n-propyl 3-hydroxypropyl fumarate; the alicyclic fumarates such as cyclopropyl fumarate, cyclopentyl fumarate and cyclohexyl fumarate or octyl cyclopentyl fumarate; the alkylmercaptoalkyl fumarates such as bis(4-ethylmercaptobutyl) fumarate; the aryl fumarates such as phenyl fumarate, β-naphthyl fumarate, 2-xenyl fumarate, or ethylphenyl fumarate or 2-ethoxyethyl β-naphthyl fumarate; the aralkyl fumarates such as benzyl fumarate or amyl benzyl fumarate, furfuryl fumarate, tetrahydrofurfuryl fumarate, phenyl furfuryl fumarate; as well as the corresponding halogenofumarates e. g., butyl chlorofumarate or ethyl phenyl bromofumarate; the corresponding dihalogenofumarates, e. g., bis(2-ethoxyethyl) dichlorofumarate; the corresponding mesaconates, e. g., 2-xenyl mesaconate, the corresponding dimethylfumarates, e. g., n-amyl dimethylfumarate, etc.

Reaction of natural rubber with the present esters to form the adducts takes place readily by heating rubber, i. e., natural crepe rubber or rubber latex, with the esters in the presence or absence of an inert diluent or rubber-solvent at ordinary or superatmospheric pressures. When operating at atmospheric pressure, temperatures of from, say, 125° C. to 300° C. and preferably of from 180° C. to 250° C. are used. When working with readily polymerizable fumarates, an inhibitor of polymerization may be incorporated into the reaction mixture. The number of carboalkoxy groups introduced into the macromolecule depends upon the nature of the individual ester used, and upon the reaction conditions employed. Generally, operation within the higher temperature ranges, i. e., at temperatures of above, say, 180° C. and below the decomposition point of any of the reactants leads to introduction of more carboalkoxy groups than does operation at the lower temperatures. Usually, the lower alkyl fumarates are more reactive than either the higher alkyl fumarates or the higher alkoxyalkyl fumarates. In view of the effect of the reaction conditions and nature of the fumarates upon the extent of carboalkoxylation, it is recommended that for each initial run there be experimentally determined the operating conditions which should be observed for obtaining the desired degree of carboalkoxylation.

The quantity of ester present in the adduct will also depend upon its availability in the reaction mixture. Obviously, for the formation of adducts in which at least one mole of the fumarate or the like has added to each repeat unit of the rubber, the calculated amount of fumarate must be present in the reaction mixture.

Since the presently useful esters are very good solvents for the rubber-like polymers under the reaction conditions used, no extraneous solvent or diluent need be employed. However, in order to facilitate handling of the rubber, it is advantageous to work with a solution of the rubber in an inert, extraneous diluent or solvent, e. g., a liquid hydrocarbon or a liquid derivative thereof such as benzene, xylene, nitrobenzene or dichlorobenzene, a high-boiling aliphatic hydrocarbon such as kerosene, halogenated aliphatic hydrocarbons such as chloroform or tetrachloroethane, etc. When operating at atmospheric pressure such diluent is generally removed before reaction of the rubber with the fumarate occurs, due to the high temperatures used. For successful reaction, the diluent may or may not be present. In order to avoid local overheating, the heating and distilling operations are conducted on the oil-bath.

The contemplated use of the rubber-fumarate adducts will determine the extent of carboalkoxylation desired. Adducts having a low proportion of carboalkoxy radicals are advantageously employed as adhesives and bonding agents, particularly as adhesives in bonding fibers such as rayon cord to rubber in tire-manufacturing processes. Adducts having a higher proportion of carboalkoxy groups, on the other hand, may be usefully employed as lubricant additives.

That the natural rubber-fumarate reaction products are adducts rather than blends of natural rubber and polymeric fumarates is evidenced by hydrolysis of the reaction products to completely water-soluble materials. Thus, as will be hereafter disclosed, upon heating the present reaction products with aqueous metal hydroxides or ammonia, they are entirely converted to water-soluble salts. Treatment of the salts with dilute mineral acids yields the free polycarboxylic acids. The present invention thus provides not only the ester adducts, but also a new series of polycarboxylic acids and their alkali metal or ammonium salts.

The invention is further illustrated, but not limited, by the following examples:

Example 1

A solution of 100 g. of pale, crepe Hevea rubber in 1100 g. of benzene was charged to a 3-necked flask equipped with stirrer, thermometer, inlet tube reaching to the bottom of the flask and a Dean-Stark trap carrying a reflux condenser. The reaction mixture was heated in a nitrogen atmosphere to a temperature of 90° C., at which time the benzene began to distill off and there was then started the dropwise addition of 1000 g. of ethyl fumarate. Addition of the fumarate to the distilling reaction mixture was effected over a period of about two hours. The reaction mixture attained a temperature of 135° C. at the time addition of the fumarate was completed. It was then brought to 192° C. within about 20 minutes and maintained at 192°–197° C. for an additional 7.5 hours. Heating was effected by means of an oil-bath. The temperatures herein shown are those of the liquid reaction mixture. During the heating 30.1 g. of ethyl fumarate was collected in the trap. Distillation of the resulting reaction mixture to remove material boiling up to 170° C./1–2 mm. gave 854 g. of ethyl fumarate, $n_D^{25}$ 1.4393. The residue, 209 g., was a viscous material, $n_D^{25}$ 1.4987, analyzing 70.58% C, and 9.15% H and (by difference) 20.27% O. It is an adduct in which 100 g. of the rubber had combined with 109 g. (0.635 mole) of ethyl fumarate. Based on the molecular weight of a methylbutene, or repeat rubber unit as 68.1, in the present adduct an average of 0.43 mole of ethyl fumarate had combined with each repeat unit of the rubber. An adduct of this content has calculated values of 71.48% C and 9.28% H. These agree very well with the experimentally determined values shown above.

The adduct was advantageously employed as a bonding agent for the incorporation of rayon cord into rubber. The static adhesion efficiency of rayon cord treated with the present rubber-ethyl fumarate adducts was found to be 145 as compared with 100 for the untreated cord.

Example 2

This example shows the effect of longer heating time and higher reaction temperatures on the addition of ethyl fumarate to natural rubber.

Employing the equipment of Example 1, a solution of 120 g. of the pale, crepe Hevea rubber in 1080 g. of benzene was brought to a temperature of 82° C. and dropwise addition of 1200 g. of ethyl fumarate was started. Within 1 hour and 40 minutes the temperature of the reaction mixture had reached 205° C. It was then maintained at 205°–214° C. (liquid temperature) for 12 hours. Distillation of the reaction mixture at a temperature of up to 182° C./1–2 mm. gave 680 g. of ethyl fumarate. The residue, 511 g., was a somewhat viscous, light-colored liquid, $n_D^{25}$ 1.4850, having a saponification equivalent of 92.94 and analyzing 62.72% C and 8.07% H. It was an adduct in which 120 g. (1.765 moles) had combined with 391 g. (2.275 moles) of ethyl fumarate. The residue is thus an adduct in which an average of 1.29 moles of ethyl fumarate is combined with each repeat unit of the rubber. An adduct of this content has calculated values of 62.72% C and 8.01% H. These agree perfectly with the experimentally determined values shown above.

Example 3

Complete hydrolysis of the adduct from natural rubber and 1.29 moles of diethyl fumarate (Example 2) was accomplished by heating 14.5 g. (0.05 mole) of the adduct in 258 g. of 0.5 N sodium hydroxide (50% aqueous ethanol solution) for 6 hours at reflux temperature.

The alcohol-water mixture was distilled, under reduced pressure. The residual sodium salt (13.7 g.) was completely soluble in 86.3 g. of water at room temperature.

What I claim is:

1. As a new product a compound selected from the class consisting of a viscous adduct of natural rubber and an ester having the formula

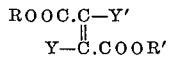

in which R and R′ are selected from the class consisting of alkyl radicals of from 1 to 8 carbon atoms, alkoxyalkyl radicals of from 2 to 8 carbon atoms, alkylmercaptoalkyl radicals of from 4 to 8 carbon atoms, alicyclic radicals of from 3 to 6 carbon atoms, aryl radicals of from 1 to 12 carbon atoms and aralkyl radicals of from 7 to 11 carbon atoms and the furfuryl and tetrahydrofurfuryl radicals, and Y and Y′ are selected from the class consisting of hydrogen, chlorine and the methyl radical, from 1 to 3 moles of said fumarate being combined at each of at least 5 per cent of the olefinic units of said rubber; and the free acids and alkali metal and ammonium salts obtained by hydrolysis of said adducts.

2. A viscous adduct of natural rubber and an ester having the formula

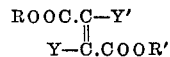

in which R and R′ are selected from the class consisting of alkyl radicals of from 1 to 8 carbon atoms, alkoxyalkyl radicals of from 2 to 8 carbon atoms, alkylmercaptoalkyl radicals of from 4 to 8 carbon atoms, alicyclic radicals of from 3 to 6 carbon atoms, aryl radicals of from 1 to 12 carbon atoms and aralkyl radicals of from 7 to 11 carbon atoms and the furfuryl and tetrahydrofurfuryl radicals, and Y and Y′ are selected from the class consisting of hydrogen, chlorine and the methyl radical, from 1 to 3 moles of said fumarate being combined at each of at least 5 per cent of the olefinic units of said rubber.

3. A viscous adduct of natural rubber and an alkyl fumarate in which the alkyl radical has from 1 to 8 carbon atoms, from 1 to 3 moles of said fumarate being combined at each of at least 5 per cent of the olefinic units of the rubber molecule.

4. A viscous adduct of natural rubber and ethyl fumarate, from 1 to 3 moles of said fumarate being combined at each of at least 5 per cent of the olefinic units of the molecule.

5. The method which comprises heating natural rubber at a temperature of from 180° C. to 250° C. with an ester having the formula

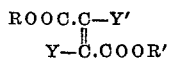

in which R and R′ are selected from the class consisting of alkyl radicals of from 1 to 8 carbon atoms, alkoxyalkyl radicals of from 2 to 8 carbon atoms, alkylmercaptoalkyl radicals of from 4 to 8 carbon atoms, alicyclic radicals of from 3 to 6 carbon atoms, aryl radicals of from 1 to 12 carbon atoms and aralkyl radicals of from 7 to 11 carbon atoms and the furfuryl and tetrahydrofurfuryl radicals, and Y and Y′ are selected from the class consisting of hydrogen, chlorine and the methyl radical, and recovering from the resulting reaction product a viscous adduct in which from 1 to 3 moles of said fumarate is combined at each of at least 5 per cent of the olefinic units of said rubber.

6. The method which comprises heating natural rubber at a temperature of from 180° C. to 250° C. with an alkyl fumarate in which the alkyl radical has from 1 to 8 carbon atoms and recovering from the resulting reaction product a viscous adduct in which from 1 to 3 moles of said fumarate is combined at each of at least 5 per cent of the olefinic units of said rubber.

7. The method which comprises heating natural rubber at a temperature of from 180° C. to 250° C. with ethyl fumarate and recovering from the resulting reaction product a viscous adduct in which from 1 to 3 moles of ethyl fumarate is combined at each of at least 5 per cent of the olefinic units of said rubber.

References Cited in the file of this patent

UNITED STATES PATENTS

| | | |
|---|---|---|
| 2,273,593 | Redfern | Feb. 17, 1942 |
| 2,383,569 | Roberts | Aug. 28, 1945 |
| 2,422,550 | Jacobson | June 17, 1947 |

FOREIGN PATENTS

| | | |
|---|---|---|
| 602,843 | Great Britain | June 3, 1948 |